US 6,633,152 B2

(12) United States Patent
Sharrah et al.

(10) Patent No.: US 6,633,152 B2
(45) Date of Patent: Oct. 14, 2003

(54) RECHARGEABLE FLASHLIGHT AND BATTERY CHARGER

(75) Inventors: Raymond L. Sharrah, Collegeville, PA (US); John C. DiNenna, Norristown, PA (US)

(73) Assignee: Streamlight, Inc., Norristown, PA (US)

( * ) Notice: Subject to any disclaimer, the term of this patent is extended or adjusted under 35 U.S.C. 154(b) by 0 days.

(21) Appl. No.: 09/843,458

(22) Filed: Apr. 26, 2001

(65) Prior Publication Data

US 2002/0158605 A1 Oct. 31, 2002

(51) Int. Cl.$^7$ .............................................. H01M 12/46
(52) U.S. Cl. ....................................... 320/114; 362/202
(58) Field of Search ................................. 320/111, 112, 320/113, 114, 115; 362/190, 194, 196, 197, 202, 203

(56) References Cited

U.S. PATENT DOCUMENTS

| 2,701,332 | A | | 2/1955 | Andre |
| 3,999,110 | A | | 12/1976 | Ramstrom et al. |
| 4,092,580 | A | * | 5/1978 | Prinsze |
| 4,463,283 | A | | 7/1984 | Penney et al. |
| 4,634,810 | A | | 1/1987 | Grassl et al. |
| 5,046,131 | A | | 9/1991 | Takahashi et al. |
| 5,136,229 | A | | 8/1992 | Galvin |
| 5,142,458 | A | | 8/1992 | Brunson |
| 5,225,760 | A | | 7/1993 | Leiserson |
| 5,327,067 | A | | 7/1994 | Scholder |
| 5,347,208 | A | | 9/1994 | Iida |
| 5,410,237 | A | | 4/1995 | Sharrah et al. |
| 5,525,888 | A | | 6/1996 | Toya |
| 5,656,914 | A | | 8/1997 | Nagele et al. |
| 5,707,137 | A | | 1/1998 | Hon |
| 5,746,495 | A | | 5/1998 | Klamm |
| 5,871,272 | A | | 2/1999 | Sharrah et al. |
| 5,903,132 | A | | 5/1999 | Ohira et al. |
| 5,908,233 | A | * | 6/1999 | Heskett et al. |
| 6,002,236 | A | | 12/1999 | Trant et al. |
| 6,018,227 | A | | 1/2000 | Kumar et al. |
| 6,049,192 | A | | 4/2000 | Kfoury et al. |
| 6,054,839 | A | | 4/2000 | Guimier et al. |
| 6,124,699 | A | | 9/2000 | Suzuki et al. |
| 6,236,187 | B1 | | 5/2001 | Chen |
| 6,316,911 | B1 | * | 11/2001 | Moskowitz et al. |
| 6,350,040 | B1 | | 2/2002 | Parker |

OTHER PUBLICATIONS

Pelican Products "Big Ed" product literature, undated, 3 pages.

* cited by examiner

Primary Examiner—Edward H. Tso
(74) Attorney, Agent, or Firm—Dann Dorman Herrell & Skillman, P.C.

(57) ABSTRACT

A rechargeable flashlight and charging assembly are provided in which the charger has a receptacle for vertically receiving a flashlight therein. The charger further has a second receptacle for holding an auxiliary battery, and a latch for securely holding the auxiliary battery in the second receptacle. The flashlight is formed to removably contain a battery assembly. A pivotal cover member of the flashlight provides access to the battery compartment and has a pair of conductors situated therein for connection to charging contacts within the charging receptacle.

11 Claims, 7 Drawing Sheets

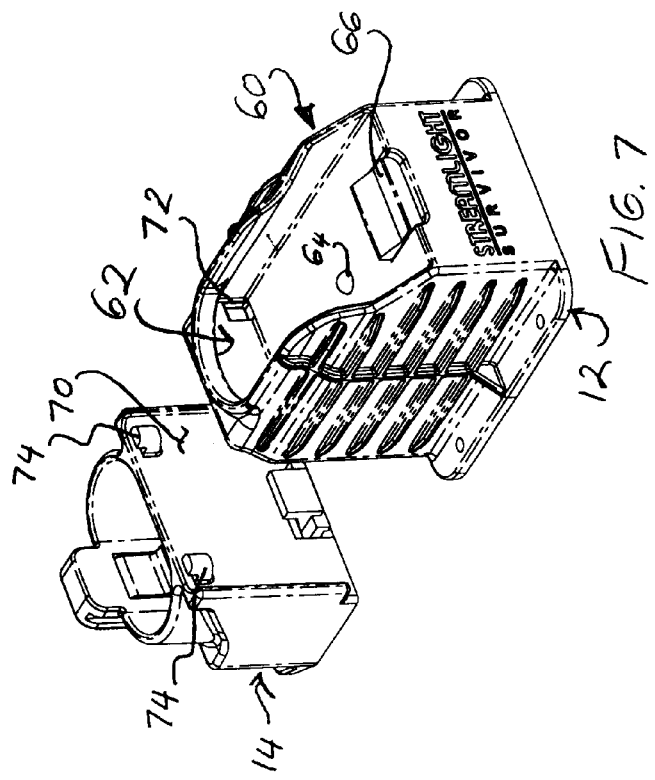
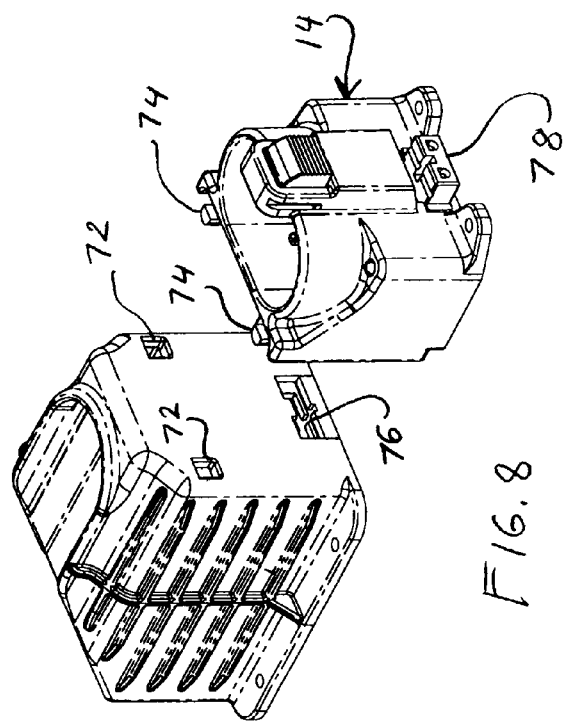

RECHARGEABLE FLASHLIGHT AND BATTERY CHARGER

BACKGROUND

Rechargeable flashlights are known in which a flashlight containing a rechargeable battery is configured to connect with a battery charger for charging the battery while it remains in the flashlight. Such flashlights are particularly desirable for emergency workers who must depend upon having a readily available source of light at remote locations. Although such flashlights are normally stored in a charging assembly, the battery may become discharged through repeated or extended use if there has not been enough time to fully recharge the battery between uses. In such a situation, it is necessary to return the flashlight to the charger for sufficient time to recharge. During this recharging time, the flashlight is unavailable for use. Thus it would be desirable to provide a rechargeable flashlight system in which an auxiliary battery is maintained in a charged condition so that the discharged battery may be removed from the flashlight and replaced by the auxiliary battery.

It would further be desirable for the auxiliary battery charger to be integrated with the flashlight charger so that the flashlight, the flashlight charger, and the auxiliary battery charger are maintained at a single location. Since many emergency crews already possess rechargeable flashlights, it would be desirable to provide an auxiliary battery assembly capable of being attached to an existing rechargeable flashlight system to provide for the ability to replace a discharged battery in such an existing rechargeable flashlight system.

Flashlights employed by emergency workers are often maintained aboard vehicles, and are used in hazardous locations. It is essential for a rechargeable flashlight system to hold the flashlight securely, and for the flashlight to be watertight and mechanically reliable.

SUMMARY

In accordance with the present invention, there is provided a rechargeable flashlight system which provides a flashlight having a rechargeable battery assembly, a flashlight charger for receiving the flashlight and charging the battery within the flashlight, and an auxiliary battery charger configured to be integrated with the flashlight charger for holding, charging, and maintaining the charge of an auxiliary battery assembly compatible with the flashlight.

The flashlight comprises a body having a central cavity for holding a rechargeable battery. The lower end of the body is closed by a cover member which opens to permit removal of the body. A pair of conductors extends through the cover member for contact with the flashlight charger, which recharges the battery when the flashlight is positioned in a receptacle in the flashlight charger. The lower end of the body is flared to mate with upward and inwardly extending walls of the receptacle by abutment, to securely hold the flashlight in the receptacle during charging.

An auxilliary battery charger is attached to the flashlight charger. The auxilliary battery charger is formed to provide a receptacle for receiving an auxilliary rechargeable battery. A latch mechanism connected with the auxilliary battery charger holds the auxiliary battery securely in the receptacle during charging.

The rechargeable battery comprises a case for holding rechargeable cells. Contacts are provided through the upper end of the case to provide contact with connectors positioned in the upper end of the interior of the body cavity. Contacts are also provided at the lower end of the case to connect with the rear cover member conductors of the flashlight when positioned therein, or with charging contacts positioned in the receptacle of the auxiliary battery charger.

BRIEF DESCRIPTION OF THE DRAWING

FIG. 7 is a perspective view of a flashlight charger and an auxiliary batter charger of the rechargeable flashlight system of FIG. 1, shown in a disassembled condition;

FIG. 8 is a perspective view of the flashlight charger and the auxiliary battery charger of FIG. 7 shown from the reverse perspective;

DETAILED DESCRIPTION

Figure 1:
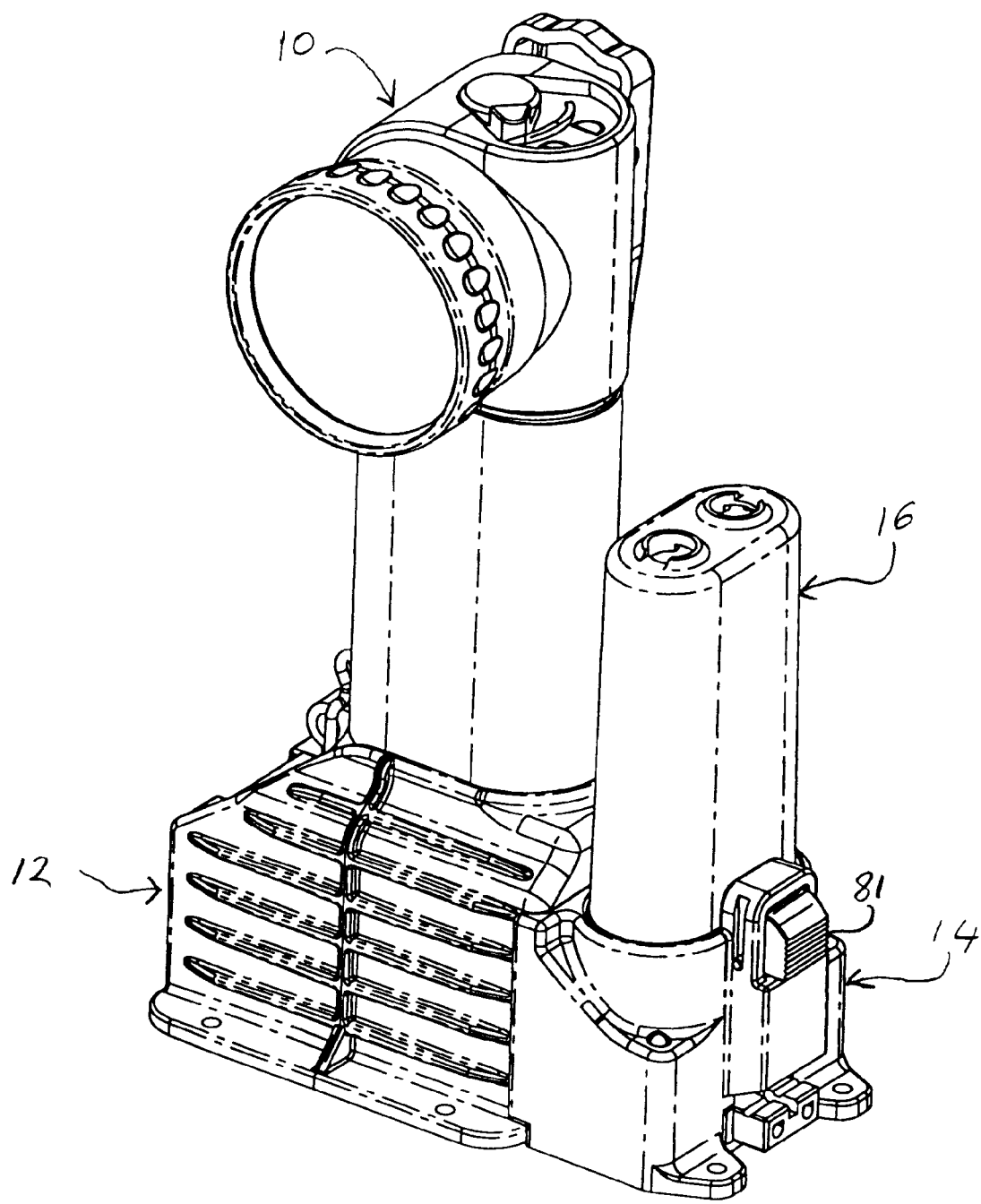
FIG. 1 is a perspective view of a rechargeable flashlight system.

Referring now to FIG. 1 there is shown a flashlight 10, a flashlight charger 12, and an auxiliary battery charger 14 holding an auxiliary battery 16 in an assembled configuration. Each of these components is described separately below.

Figure 3A:
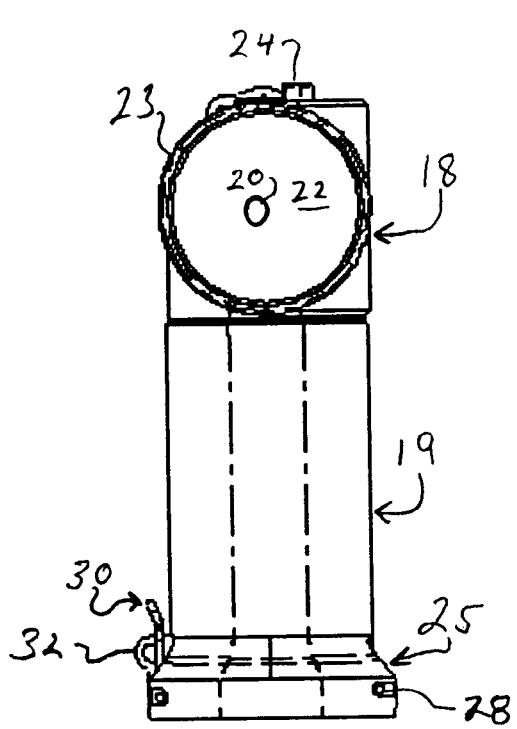
FIGS. 3A and 3B are respective front and side elevational views of the flashlight of the rechargeable flashlight system of FIG. 1.
Figure 3B:
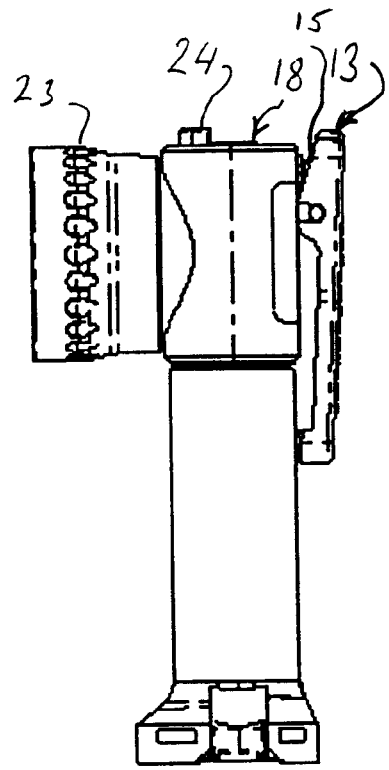

The flashlight 10 is shown separated from the charger 12 in FIGS. 3A and 3B. The flashlight comprises a head assembly 18 and a body 19 having a central cavity therein for receiving a battery assembly. In the head assembly 18, a light bulb 20 is positioned at the center of a reflector 22 which is held in a reflector housing 23. The reflector is positioned at an angle, preferably a right angle, to the central axis of the flashlight. A clip 13 is pivotally connected to the rear of the flashlight. A spring 15 is positioned between the body of the flashlight and the upper end of the clip, so that the lower end of the clip 13 is urged toward the body. The clip 13 and the angled configuration of the flashlight allows the flashlight to be attached to an article of clothing of the user, such that light is projected in the forward direction when the flashlight is worn by the user. A switch 24 is located on the head assembly 24 and is internally connected between the bulb 20 and a battery assembly to selectively connect the bulb with the battery assembly.

Figure 4:
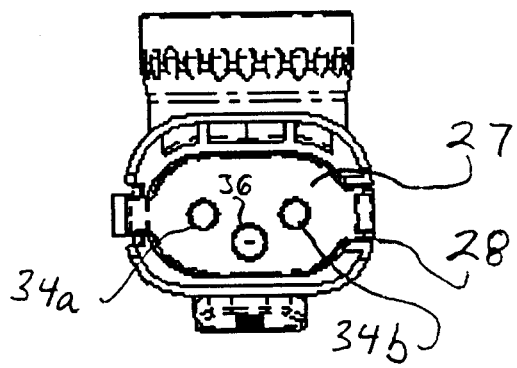
FIG. 4 is a bottom view of the flashlight of the rechargeable flashlight system of FIG. 1.

The bottom portion of the body 19 of the flashlight 10 comprises a flared portion which provides a lip or rim extending outwardly about the bottom of the body 19 of the flashlight 10. As shown in FIG. 4, the bottom end of the flashlight 10 is closed by a bottom cover member 27. The bottom cover member 27 is attached to the body 19 by a hinge 28 at one side of the bottom cover member. The cover member 27 is held to the body 19 at the other side thereof by a releasable clip 30 which is pivotally held by the cover member 27 to latch onto a latch member 32 formed on the lower portion of the body 19 of the flashlight.

Figure 5:
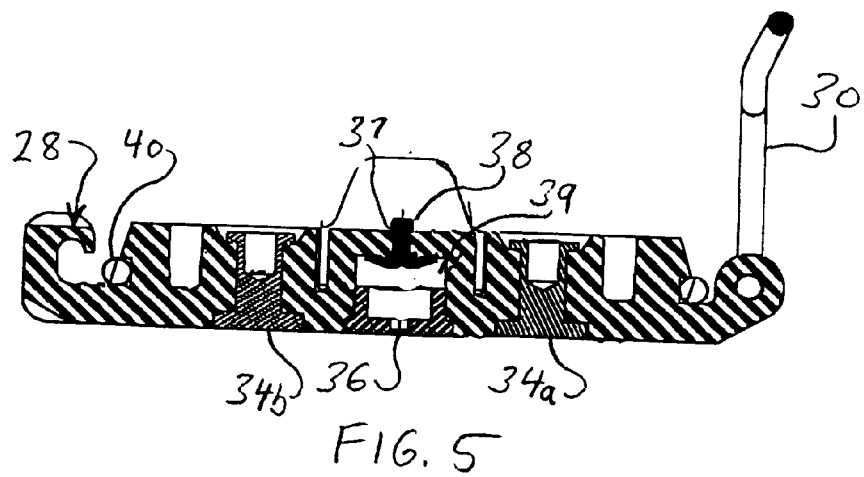
FIG. 5 is a cross-sectional view of a bottom cover member of the flashlight.
Figure 6:
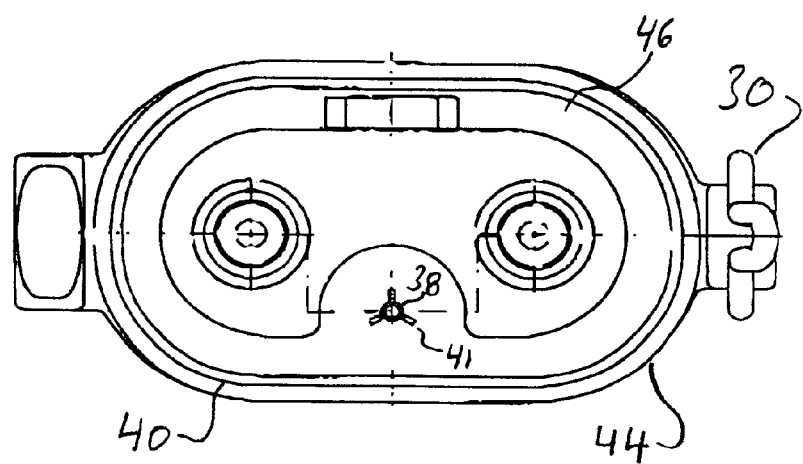
FIG. 6 is a top plan view of the bottom cover member of the flashlight.

The cover member 27 has a pair of conductors 34a and 34b which extend through the cover member 27, as shown in FIG. 5, to provide exterior charging contacts on the external surface thereof and to conduct electricity to a pair or rear charging contacts located on the battery assembly. The cover member 27 also has a vent hole 36 formed therein for venting gas from an internal check valve member 38 positioned in cover member 27. The valve member 38 is formed of a flexible material and is configured to have a central boss which is compressively held in a hole 37 formed through the interior surface of the cover member 27. The valve member has a widened concave skirt about one end of the boss which is pressed flush against the top end of a vent cavity formed in the cover member. As best seen in FIG. 6, several slits 41 are formed adjacent to the hold 37 to provide a pathway for gas within the flashlight body to flow through the cover member 27 toward the skirt of the valve member. The concave skirt is flexible to allow gas to exit the flashlight body, but provides a seal against gas entering the flashlight body.

Figure 2:
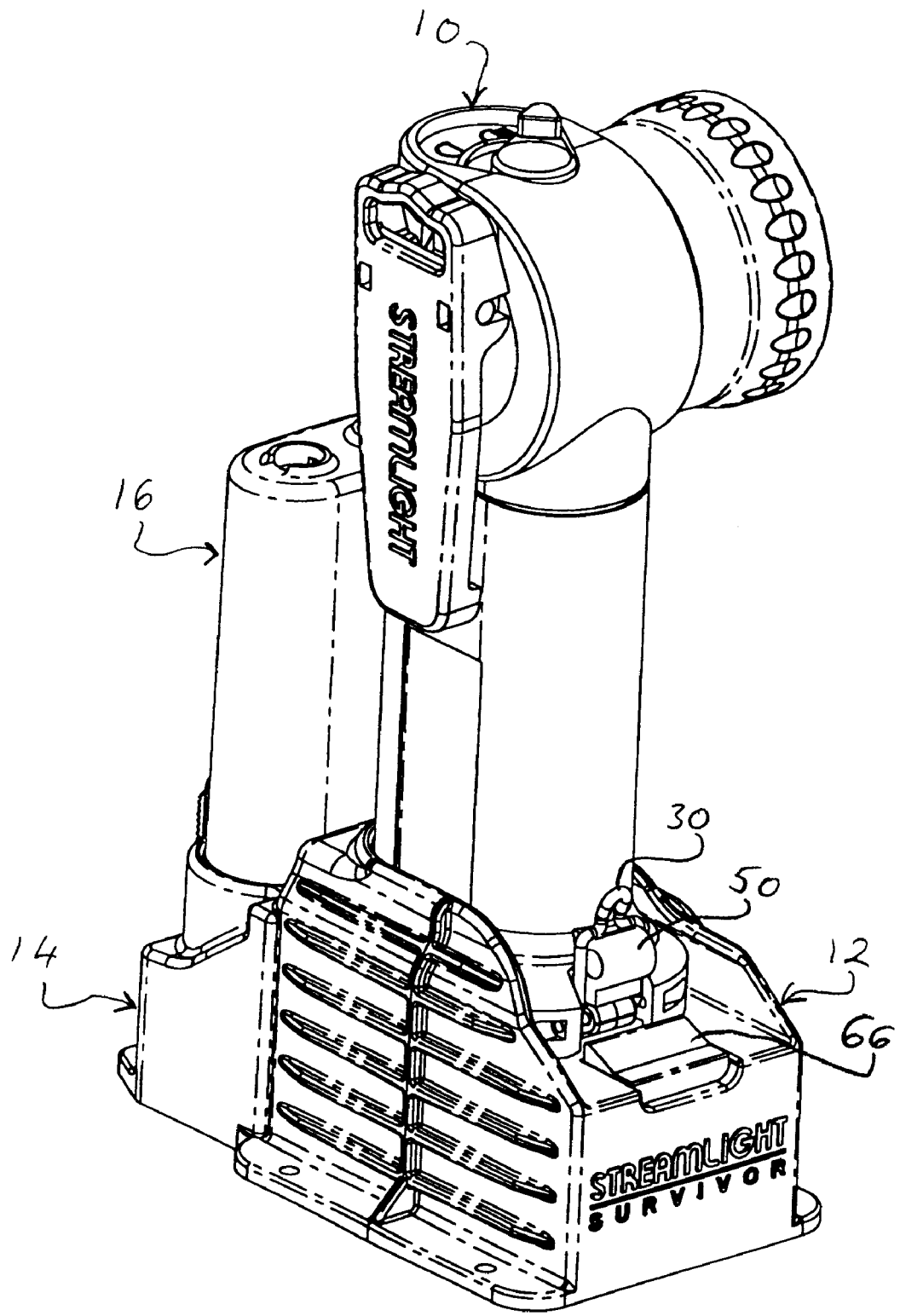
FIG. 2 is a perspective view of the rechargeable flashlight system of FIG. 1, from the reverse perspective.

The cover member further has an outer rim 44 and sealing surface 44 which extends into the flashlight body when the cover is in the closed position. A groove is formed around the periphery of the sealing surface, and an O-ring 40 is situated in the groove to provide a fluid tight seal between the cover member and the rear opening of the body of the flashlight. As can be seen in FIG. 2, when the flashlight is closed, the clip 30 swings upwardly from the cover member 27 to latch with a projection 50 formed at the lower end of the flashlight body. The O-ring is compressed to form a fluid-tight seal between the cover member 27 and the flashlight body when the clip 30 is engaged onto the latching projection 50.

The flashlight charger 12 is shown separated from the flashlight in FIG. 7. The flashlight charger 12 comprises a body for housing charging circuitry, such as a transformer and a rectifier for converting AC to DC current in applications where such conversion is desired. The upper wall portion 60 of the charger 12 extends upwardly and inwardly to mate with the flared contour of the lower end of the flashlight, and forms a receptacle 62 for laterally receiving the lower end of the flashlight. The bottom surface of the receptacle 62 has a pair of spring-loaded contacts, such as contact 64 shown in FIG. 7, which extend upwardly through the bottom surface of the receptacle to connect with the conductors extending through the bottom cover member of the flashlight. The bottom surface of the receptacle 62 has a lateral extent larger than the bottom surface of the flashlight, and has a spring-loaded latch member 66 extending upwardly at the flashlight-receiving side of the receptacle 62. As the flashlight is laterally inserted into the receptacle 62, the latch member 66 is depressed by the bottom of the flashlight as it slides over the latch member 66 into the receptacle. When the flashlight is fully inserted into the receptacle, the latch member 66 is again pushed upwardly by a spring mounting within the charger 12 in order to secure the flashlight into the receptacle 62, as can be seen in FIG. 2. In order to remove the flashlight from the receptacle, the latch member 66 is depressed by the user to permit the bottom of the flashlight to slide over the latch member and out of the receptacle.

Referring again to FIG. 7, the auxiliary battery charger 14 is shown separated from the flashlight charger 12. The auxiliary battery charger 14 has a mating surface 70 which is configured to conform with a rear surface of the flashlight charger 12. To attach the auxiliary battery charger 14 to the flashlight charger 12, a pair of openings 72 are formed in the rear surface of the flashlight charger 12 to receive a pair of engaging members 74 connected to the mating surface 70 of the auxiliary battery charger 14. Prior to mechanical engagement of the auxiliary battery charger 14 and the flashlight charger 12, charging circuitry within the auxiliary battery charger 14 is connected in parallel with the charging circuitry of the flashlight charger 12 by a pair of wires (not shown) which pass from the auxiliary battery charger 14 into an existing connector via 76 in the rear of the flashlight charger. The projections 74 are then inserted into the holes 72, and the mating surface of the auxiliary charger may be further secured to the flashlight charger by adhesive. An electrical connector 78 is seated within the rear end of the auxiliary battery charger 14 to provide electrical connection to an external source of electricity, such as AC line current or a vehicular DC electrical system. It will be appreciated that the flashlight charger and the auxiliary battery charger may be connected together as shown or, in alternative embodiments, may be manufactured as an integrated unit.

Figure 9:
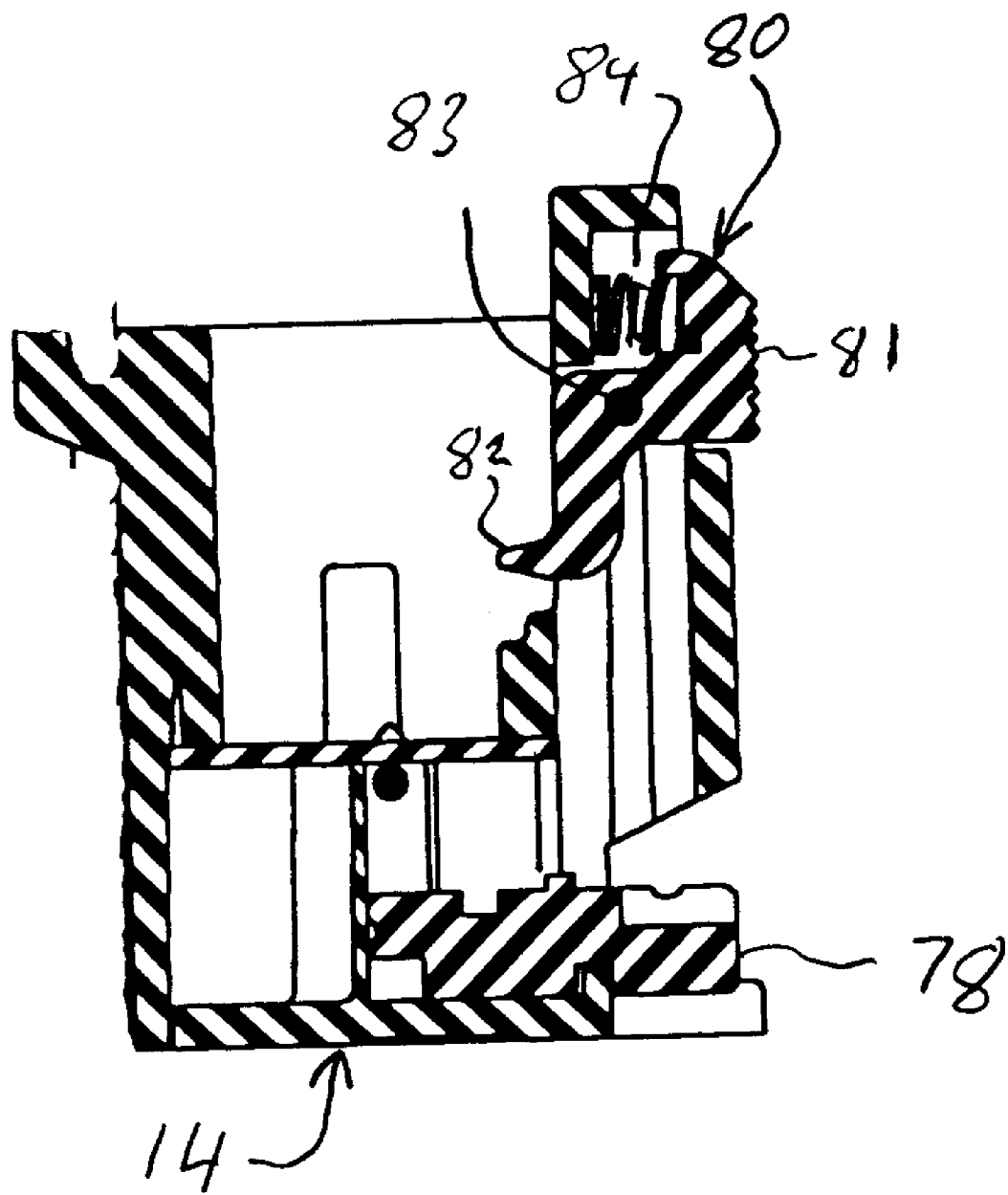
FIG. 9 is a cross sectional view of the auxiliary battery charger.

The auxiliary battery charger 14 is shown in cross section in FIG. 9. A latch member 80 is mounted in one side of the charger 14 by a pivot 83. A spring 84 is positioned between an interior surface of the charger 14 and the upper end 81 of the latch member 80. The upper end 81 of the latch member 80 extends to the exterior of the charger 14. The lower end of the latch member 81 has an engaging projection 82 formed thereon and extending into the receptacle for engagement with compatible notch formed in the battery assembly and discussed below. Pressing upon the upper end 81 of the latch member 80 compresses the spring and moves the engaging projection 82 out of the receptacle in order to permit removal of the battery assembly from the receptacle.

Figure 10:
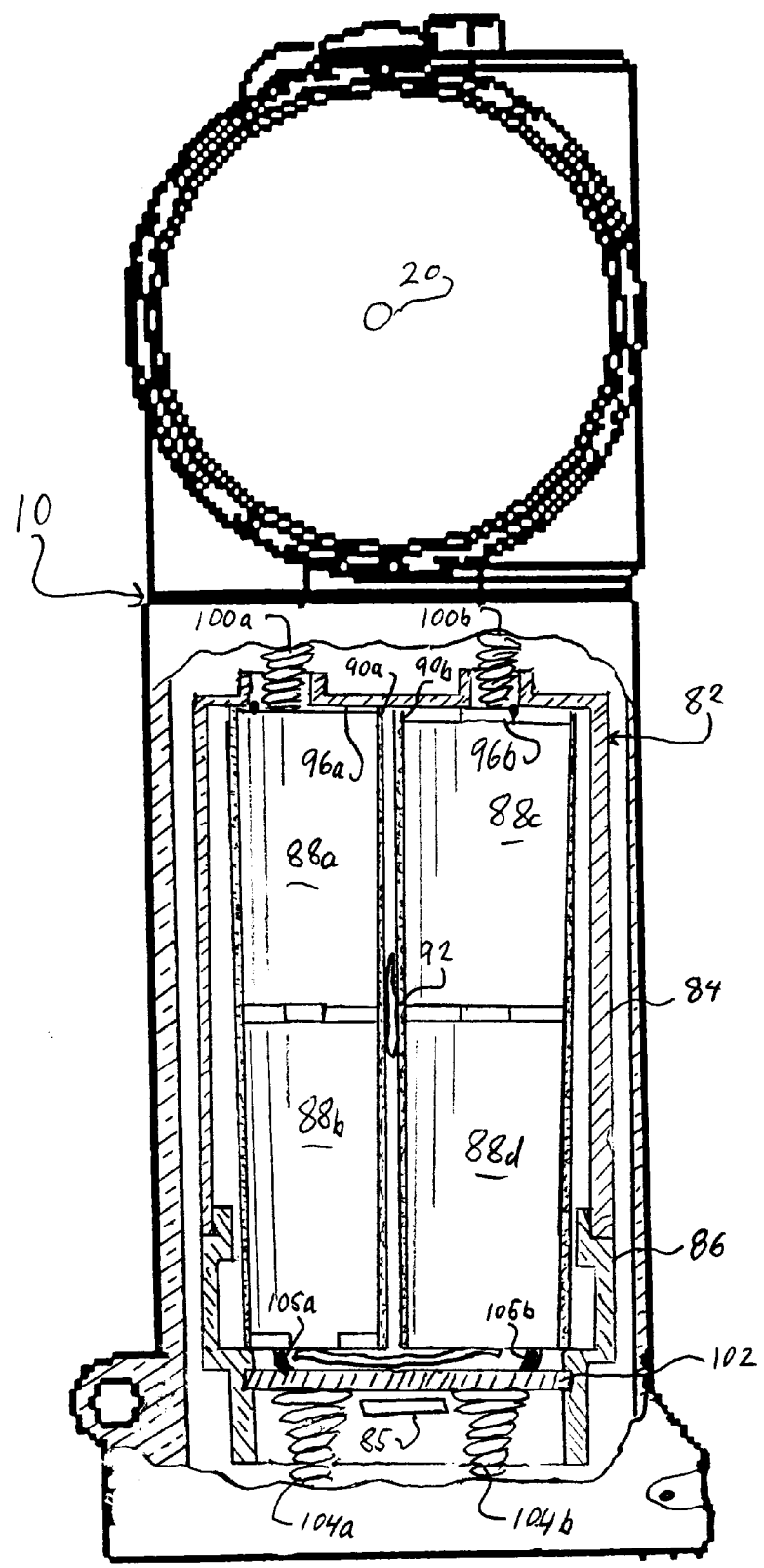
FIG. 10 is a partial cutaway view of the flashlight showing a battery assembly positioned therein in cross section.

The battery assembly 82 is shown in FIG. 10 positioned within the flashlight 10. The battery assembly comprises a case 84 having an upper portion 84 and a lower portion 86 which are joined together to house several rechargeable cells 88a–d. A notch 85 is formed in the lower portion 86 of the case 84 for engagement with the latching member of the auxiliary battery charger when the battery assembly is inserted into the auxiliary battery charger. The rechargeable cells 88a–d are preferably cylindrical cells, which are arranged in respective series pairs 88a–b and 88c–d. The series pairs are physically positioned adjacent to each other within the case 84 in parallel, and are each wrapped respective insulating paperboard jackets 90a and 90b which are secured to each other by an adhesive 92. A conductor strip 94 is connected to the respective lower ends of the series pairs 88a–b and 88c–d to connect all of the cells together in electrical series such that respective negative and positive contacts 96a and 96b are positioned at the upper end of the battery assembly 82. Openings 98a and 98b are formed in the upper end of the case 82 to allow electrical contact between the contacts 96a and 96b and respective spring conductors 100a and 100b, which are connected to the head assembly of the flashlight and which conduct electrical current to the bulb 20.

The lower portion 86 of the case has a circuit board 102 positioned therein. A pair of springs 104a and 104b are electrically connected to the circuit board 102 and extend outward from the bottom of the battery assembly 82 for engagement with the conductors positioned in the cover member of the flashlight. It will be appreciated that, in the assembled condition, the battery assembly 82 is thus insulated from physical shock due to its positioning between springs 100a–b of the flashlight at the upper end of the battery assembly, and springs 104*a–b* of the battery assembly, and at the lower end thereof. A pair of conductors 105*a* and 105*b* are electrically connected with the springs 100*a* and 100*b* via the circuit board 102. The conductors 105*a* and 105*b* extend within the case 82 to respective connection points at the negative and positive contacts 96*a* and 96*b* of the series-connected cells 88*a–d* so that electrical current is conducted to the cells when the flashlight 10 is positioned in the flashlight charger 12. When the battery assembly is removed from the flashlight and inserted into the auxiliary battery charger, the springs 100*a* and 100*b* connect to a pair of contacts provided in the receptacle of the auxiliary battery charger in order to conduct electrical current from the auxiliary battery charger to the rechargeable cells.

That which is claimed is:

1. A charging assembly for a rechargeable flashlight system, comprising:

a body having a flashlight receptacle portion and an auxiliary battery receptacle portion;

the flashlight receptacle portion having a vertically and inwardly directed wall forming a receptacle for receiving a flashlight;

a charging contact located in the receptacle of the flashlight receptacle portion;

the battery receptacle portion having a well formed therein for receiving a rechargeable battery, and a latch for holding the battery in the battery receptacle portion.

2. The charging assembly of claim 1, wherein the flashlight receptacle portion is contoured to receive a lip portion of a terminal end portion of a flashlight, and wherein the flashlight receptacle portion has an open side for laterally receiving the lip portion of the flashlight.

3. The charging assembly of claim 2 comprising a stop member located at the open side of the flashlight receptacle portion for releasably holding the flashlight in the flashlight receptacle portion when the flashlight is received in the receptacle.

4. A battery assembly for a rechargeable flashlight, comprising:

cylindrical rechargeable cells arranged in parallel and electrically connected at a rear end in series to provide respective positive and negative contacts at a forward end of the assembly;

a shell for holding the cells and having an opening in a forward end for exposing the contacts for connection with electrical contacts positioned within a flashlight;

a rear end member connected with the shell and having a pair of charging contacts located on the rear exterior thereof; and a pair of conductors within the shell for electrically connecting the charging contacts with the respective positive and negative contacts of the cells.

5. The battery assembly of claim 4 wherein the charging contacts on the rear end member comprise springs extending rearwardly from the shell.

6. A flashlight, comprising:

a head assembly having a light bulb and a pair of rearwardly extending springs for conducting electricity to the light bulb;

a body extending rearwardly from the head assembly and having a central cavity for receiving a battery;

a rear cover member attached to the rear end of the body by a hinge, the rear cover member having a pair of conductors for conducting electricity through the rear cover member from a charger.

7. The flashlight of claim 6 wherein the rear cover member comprises a latch member for releasably holding the rear cover member in a closed position at the rear end of the flashlight.

8. The flashlight of claim 7 wherein the latch member comprises a clip attached by a hinge to a free end of the rear cover member for engagement with a clip receiving portion formed on the body of the flashlight.

9. The flashlight of claim 7 comprising a sealing member located between the rear cover member and the rear end of the flashlight for providing a fluid seal between the rear cover and the central cavity of the flashlight.

10. The flashlight of claim 9 wherein the rear cover member comprises a vent assembly therein for providing a one-way vent between the central cavity and the exterior of the flashlight.

11. The flashlight of claim 6 wherein the body comprises a rear portion having an outwardly extending lip for engaging with an inwardly extending wall of a charging receptacle.

* * * * *